United States Patent [19]

Aiba

[11] 4,302,762
[45] Nov. 24, 1981

[54] INK JET SYSTEM PRINTER INCLUDING PLURAL INK DROPLET ISSUANCE UNITS FOR ONE COLUMN PRINTING

[75] Inventor: Masahiko Aiba, Nara, Japan

[73] Assignee: Sharp Kabushiki Kaisha, Osaka, Japan

[21] Appl. No.: 98,954

[22] Filed: Nov. 30, 1979

Related U.S. Application Data

[62] Division of Ser. No. 886,597, Mar. 14, 1978, Pat. No. 4,210,919.

[30] Foreign Application Priority Data

Mar. 14, 1977 [JP] Japan .................................. 52-28197
May 20, 1977 [JP] Japan .................................. 52-59215

[51] Int. Cl.³ ............................................ G01D 15/18
[52] U.S. Cl. .................................. 346/75; 346/140 R
[58] Field of Search .............. 346/75, 140 IJ, 140 PD

[56] References Cited

U.S. PATENT DOCUMENTS

| | | | |
|---|---|---|---|
| 3,373,437 | 3/1968 | Sweet et al. | 346/140 IJ X |
| 3,864,696 | 2/1975 | Fischbeck | 346/75 X |
| 4,014,029 | 3/1977 | Lane et al. | 346/75 X |

Primary Examiner—George H. Miller, Jr.
Attorney, Agent, or Firm—Birch, Stewart, Kolasch and Birch

[57] ABSTRACT

A plurality of ink droplet issuance units are provided for emitting plural streams of ink droplets toward a record receiving paper. The ink droplets in the respective streams are charged by a bi-valued signal through the use of a plurality of charging means in accordance with print information. The ink droplets charged by one value of the bi-valued signal are deflected as they pass through a deflection means and deposited on the record receiving paper. The ink droplets charged by the other value of the bi-valued signal are directed to a beam gutter and not deposited on the record receiving paper. In this way, one column of a dot matrix pattern is printed at a time utilizing plural streams of ink droplets.

10 Claims, 10 Drawing Figures

INK JET SYSTEM PRINTER INCLUDING PLURAL INK DROPLET ISSUANCE UNITS FOR ONE COLUMN PRINTING

This application is a divisional of copending application Ser. No. 886,597, filed on Mar. 14, 1978, now U.S. Pat. No. 4,210,919, issued July 1, 1980.

BACKGROUND OF THE INVENTION

The present invention relates to an ink jet system printer which prints a desired pattern in a dot matrix fashion and, more particularly, to a ink jet system printer of the charge amplitude controlling type.

Generally, in an ink jet system printer of the charge amplitude controlling type, ink droplets of a uniform size are emitted from an ink droplet issuance unit at a given frequency and charged to desired amplitudes in accordance with print data. The thus charged ink droplets are deflected in accordance with the charge amplitude carried thereon as they pass through a constant high voltage field established by a deflection means and deposited at desired positions on a record receiving paper, thereby printing desired patterns, in a dot matrix fashion.

More specifically, the deflection in the column direction is controlled by selecting the charge amplitude in an analog fashion, whereas the positioning in the row direction is achieved by driving a carriage to travel in the row direction at a constant speed. Therefore, the print velocity is limited to a specific value, and when the dot number for one matrix pattern is increased, the print velocity is considerably reduced because only one ink droplet issuance unit is employed in the system.

Moreover, when the matrix pattern comprises 5×7 ink droplets, the charge signal must be graded in eight levels. Therefore, the control circuit is complicated, and there is a possibility that print distortion occurs due to the charge error. Moreover, it is unavoidable that the print pattern is ultimately inclined because the carriage is driven to travel in the row direction at a constant speed even during the one column printing.

A typical ink jet system for conducting one column printing was disclosed in U.S. Pat. No. 3,373,437, entitled "Fluid Droplet Recorder with a Plurality of Jets" on Mar. 12, 1968, wherein a plurality of orifices are provided in a manifold for emitting a plurality of jets. However, it is impossible to accurately control the phase of formation of the ink droplets in the respective jets in U.S. Pat. No. 3,373,437.

OBJECTS AND SUMMARY OF THE INVENTION

Accordingly, an object of the present invention is to provide an ink jet system printer for high speed printing.

Another object of the present invention is to simplify a control circuit of an ink jet system printer of the charge amplitude controlling type.

Still another object of the present invention is to enhance the print quality in a ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a plurality of ink droplet issuance units are mounted on a carriage for emitting plural streams of ink droplets toward a record receiving paper. Each of the ink droplet issuance units are provided with a nozzle, an electromechanical transducer for vibrating the nozzle in order to emit ink droplets of a uniform size at a given frequency, and a charge electrode for charging the ink droplets in accordance with print information using a bi-valued signal. Ink droplets charged by one value of the bi-valued signal are deflected as they pass through a constant high voltage field established by a deflection means and deposited on the record receiving paper. Ink droplets charged by the other value of the bi-valued signal are directed toward a beam gutter and are not deposited on the record receiving paper. In this way, one column of a dot matrix pattern is printed at a time through the use of the plural streams of ink droplets.

In a preferred form, the respective ink droplet issuance units are provided with adjusting means for precisely adjusting the location and orientation of the respective ink droplet issuance units.

In another preferred form, the ink droplet issuance units are mounted on a carriage which is driven to rotate so that the ink droplets are radially emitted from the ink droplet issuance units toward a record receiving paper semicircularly positioned around the carriage. The rotation of the carriage functions to perform the positioning of the ink droplets in the row direction of a matrix pattern. In this form, the drive mechanism is simplified as compared with the system wherein the carriage is driven utilizing a reciprocating motion.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
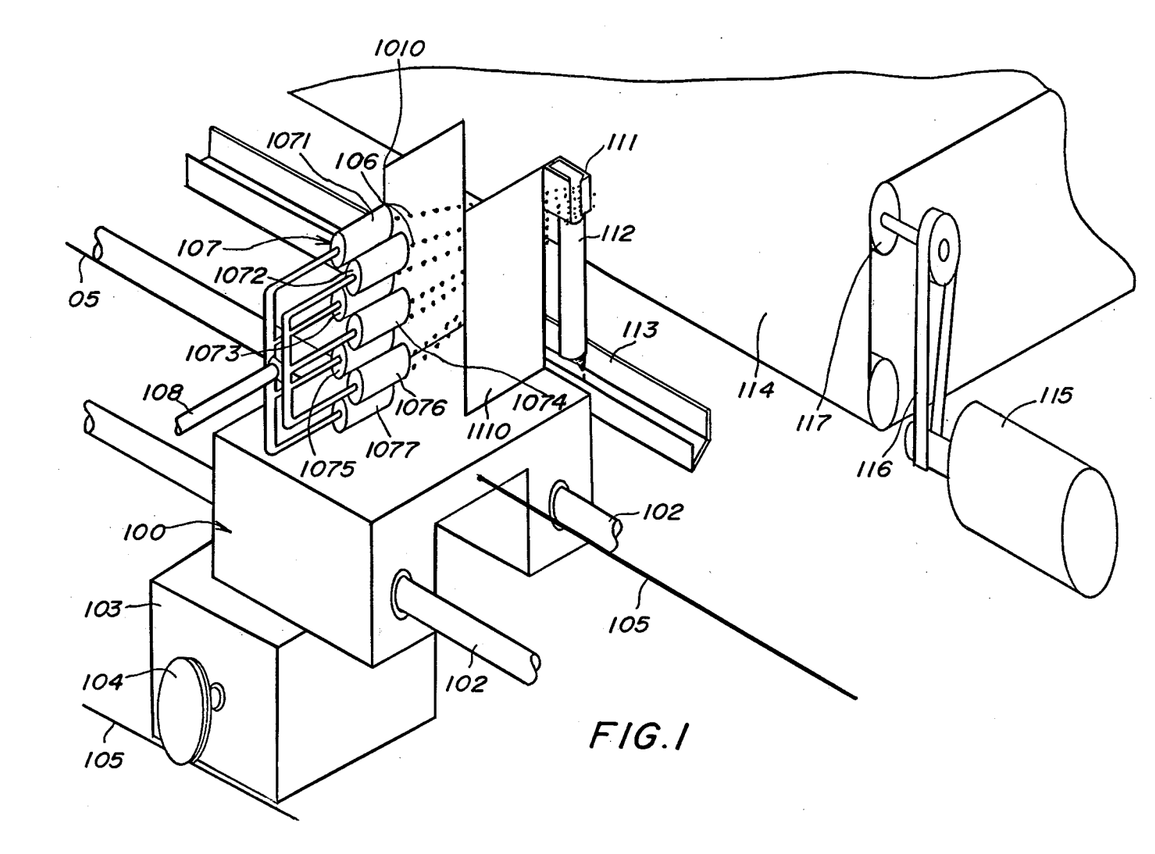
FIG. 1 is a perspective view of an embodiment of an ink jet system printer of the charge amplitude controlling type of the present invention.

FIG. 1 shows an embodiment of an ink jet system printer of the charge amplitude controlling type of the present invention, wherein a desired pattern is printed in a 5×7 matrix fashion.

A carriage 100 is slidably mounted on two parallel shafts 102. The carriage 100 is driven to reciprocate at a given speed along the shafts 102 by a servomotor 103 through a pulley 104 and a wire 105 of which the both ends are fixed to the carriage 100.

A printer head 107 including seven ink droplet issuance units 1071, 1072, 1073, 1074, 1075 1076 and 1077 is mounted on the carriage 100. Each of the ink droplet issuance units 1071–1077 emit a stream of ink droplets 106, and the number of the ink droplet issuance units 1071–1077 corresponds to the dot number in the column direction of the matrix pattern. The printer head 107 is connected to receive ink liquid under a predetermined pressure through a conduit 108.

Figure 2:
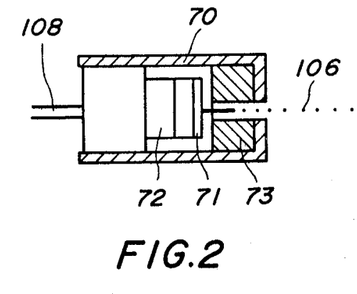
FIG. 2 is a sectional view of an ink droplet issuance unit employed in the ink jet system printer of FIG. 1.

FIG. 2 shows the ink droplet issuance unit. In FIG. 2, the ink droplet issuance unit is designated as 70.

The ink droplet issuance unit 70 comprises a nozzle 71 for issuing ink liquid, an electromechanical transducer 72 for vibrating the nozzle 71 in order to emit the ink droplets 106 of a uniform size at a given frequency, and a charging tunnel 73 for charging the ink droplet 106.

Figure 3:
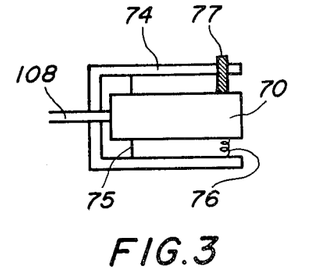
FIG. 3 is a sectional view of an ink droplet issuance unit holder employed in the ink jet system printer of FIG. 1.
Figure 4:
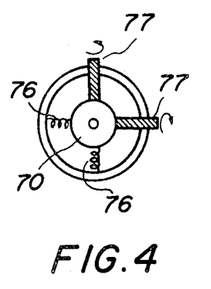
FIG. 4 is a front view of the ink droplet issuance unit holder of FIG. 3.

FIGS. 3 and 4 show a holder for accomodating the ink droplet issuance unit 70.

The ink droplet issuance unit 70 is secured within a cylindrical holder 74 through the use of a leaf spring 75. Coil springs 76 and adjusting screws 77 are provided for precisely adjusting the location and orientation of the ink droplet issuance unit 70.

The carriage 100 further supports a pair of deflection plates 1010 and 1110, a beam gutter 111, and a conduit 112. The deflection plate 1010 is maintained at the ground potential, and the deflection plate 1110 is maintained at 1 KV, thereby forming a constant high voltage field therebetween for deflecting the charged ink droplets 106 traveling therethrough. The beam gutter 111 functions to collect the ink droplets 106 not contributing to the actual writing operation, which are not charged nor deflected. The thus collected ink droplets are conducted to a tray 113 through the conduit 112 and returned to an ink liquid reservoir (not shown) for recirculation purposes.

The ink droplets 106 charged by the charging tunnel 73 are deflected by the pair of deflection plates 1010 and 1110, and directed toward a record receiving paper 114. The thus deflected ink droplets are deposited on the record receiving paper 114, whereby a desired pattern is printed on the record receiving paper 114 in a dot matrix fashion. When one line printing is completed, the record receiving paper 114 is driven to travel by one line width through the use of a pulse motor 115, a belt 116 and a paper feed roller 117.

The seven ink droplet issuance units 1071 through 1077 are aligned in such a manner that the ink droplets 106 emitted from the respective ink droplet issuance units 1071 through 1077 are aligned in a column direction, which is perpendicular to the traveling direction of the carriage 100. That is, the direction of the emitted ink droplets is precisely adjusted by the adjusting screws 77 so that the charged ink droplets 106 emitted from the ink droplet issuance units 1071 through 1077 form one column of a dot matrix pattern on the record receiving paper 114 with a height of, for example, 0.42 mm. The charging tunnel 73 is connected to receive a voltage signal of about −200 V and, therefore, the ink droplets 106 bear a charge of the negative voltage. Accordingly, the charged ink droplets 106 are deflected toward the deflection plate 1110 while they pass through the constant high voltage field established between the pair of deflection plates 1010 and 1110.

Figure 5:
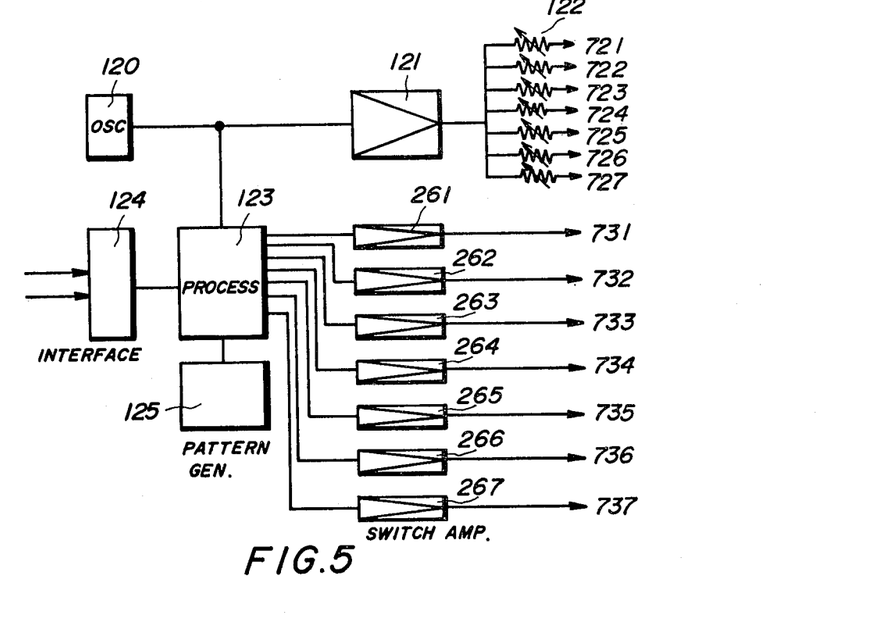
FIG. 5 is a block diagram of a control circuit of the ink jet system printer of FIG. 1.

FIG. 5 shows a control circuit of the ink jet system printer of FIG. 1.

A master oscillator circuit 120 develops a clock signal which is power amplified at an amplifier 121. The thus amplified signal is applied to electromechanical transducers 721, 722, 723, 724, 725, 726 and 727 (corresponding to the electromechanical transducer 72 of FIG. 2) of the respective ink droplet issuance units 1071 through 1077 through variable resistors 122.

The thus applied signal functions to vibrate the nozzle in the respective ink droplet issuance units at a given frequency, thereby emitting the ink droplets at the given frequency. The droplet formation timing is controlled through the use of the variable resistors 122 so that the ink droplets in the respective stream are formed in a same phase.

The clock signal derived from the master oscillator circuit 120 is also applied to a digital processor unit 123 which develops a video signal to be applied to respective charging tunnels 731, 732, 733, 734, 735, 736 and 737 (corresponding to the charging tunnel 73 of FIG. 2) of the respective ink droplets issuance units 1071 through 1077. More specifically, the processor unit 123 develops the video signals corresponding to print data introduced through an interface 124. The unit 123 functions to develop the video signals which are the logical product of the clock signal and pattern data for one column of the dot matrix pattern, said pattern data being read out from a pattern generator 125 in accordance with the print data introduced into the digital processor unit 123. The thus obtained video signals are applied to the charging tunnels 731 through 737 via video switching amplifiers 261 through 267, respectively. Generation of the video signals is timed in agreement with the formation of the ink droplets 106.

Accordingly, the ink droplets in the respective streams are charged in accordance with the pattern data for one column of the dot matrix pattern corresponding to the introduced print data. The charged ink droplets are deposited on the record receiving paper 114 for printing the one column of the dot matrix pattern at a time. Althrough not shown in FIG. 5, the digital processor unit 123 functions to control the drive of the carriage 100 and the paper feed mechanism comprising the pulse motor 115, the belt 116 and the paper feed roller 117.

Figure 6:
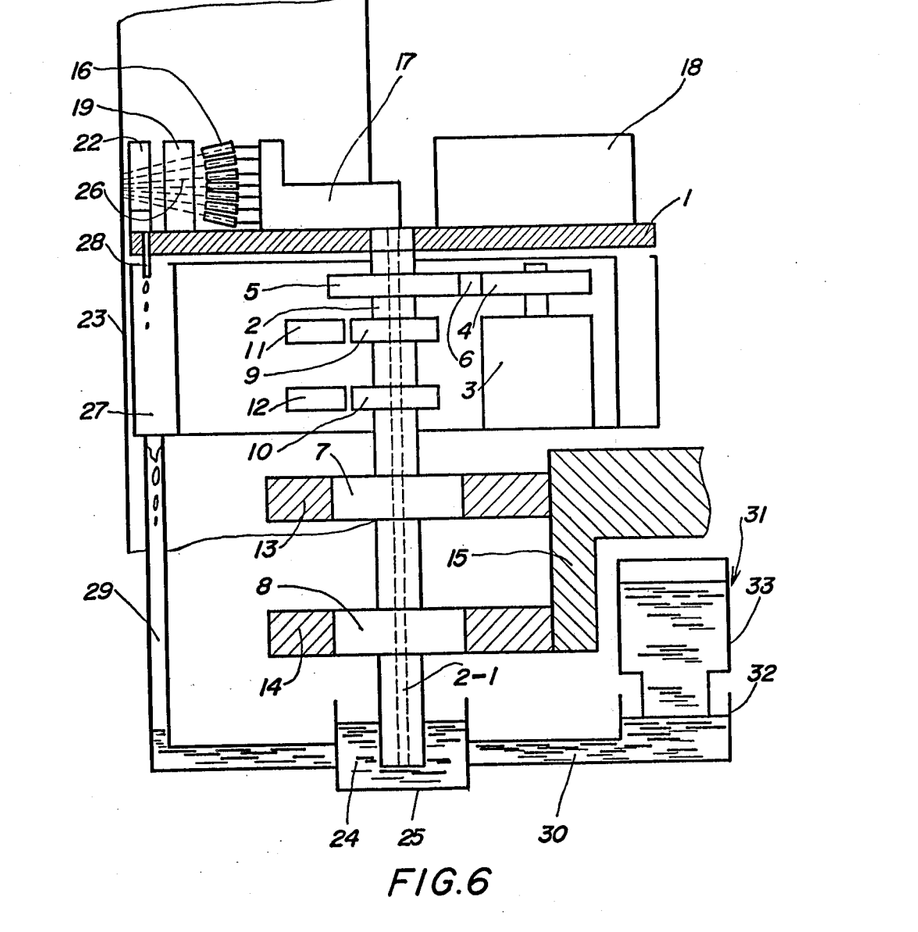
FIG. 6 is a sectional view of another embodiment of an ink jet system printer of the charge amplitude controlling type of the present invention.
Figure 7:
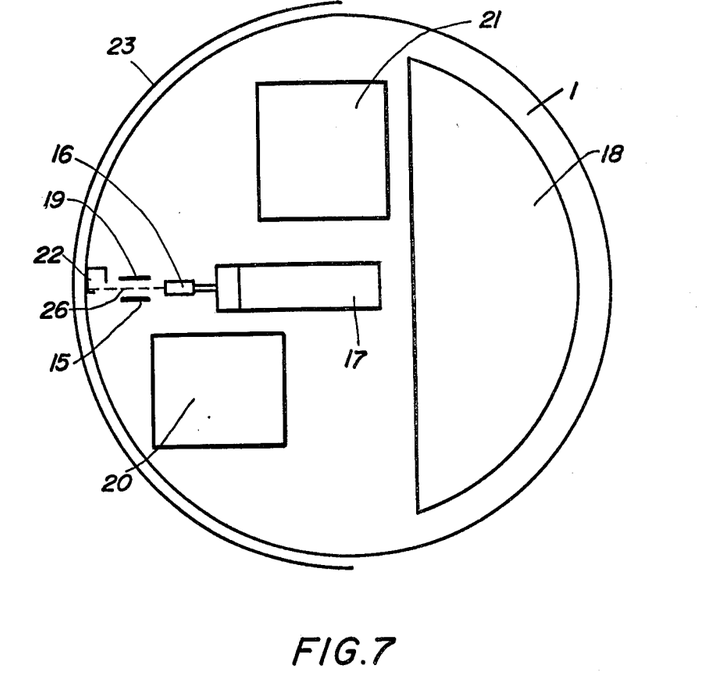
FIG. 7 is a plan view of the ink jet system printer of FIG. 6.

FIGS. 6 and 7 show another embodiment of an ink jet system printer of the charge amplitude controlling type of the present invention, wherein a desired pattern is printed in a 5×7 matrix fashion.

A circular plate 1 is mounted on a shaft 2. The circular plate 1 is driven to rotate with shaft 2 by a motor 3 through a pulley 4, a belt 6 and another pulley 5 which is secured around the shaft 2.

The shaft 2 is rotatably supported by bearings 7 and 8. Electrodes 9 and 10 are secured around the shaft 2 for electrical communication purposes between stationary electrodes 11 and 12 through the use of electrostatic induction. The electrode 9 functions to introduce print data from the stationary electrode 11 into a printer head mounted on the circular plate 1. The electrode 10 functions to develop a detection signal to the stationary electrode 12 for control purposes. The electrodes 9 and 10 are electrically connected to a data processor unit 5 mounted on the circular plate 1 through wirings secured in the shaft 2.

The bearings 7 and 8 are secured by support arms 13 and 14 and function to supply A.C. 100 V power to electric circuits mounted on the circular plate 1. The support arms 13 and 14 are fixed to a printer body 15.

A centrifugal pressure chamber 17 for supplying ink liquid to seven ink droplet issuance units 16 under a predetermined pressure, a data processor unit 18 communicated to the electrode 9 and 10, a pair of deflection electrodes 19, a high voltage unit 20 for supplying a high voltage to the deflection electrodes 19, a power supply circuit 21 for supplying the electric power to the data processor unit 18 and the high voltage unit 20, and a beam gutter 22 are mounted on the circular plate 1. A record receiving paper 23 is disposed around the circular plate 1 in a semicircular section fashion in order to receive charged and deflected ink droplets. The seven ink droplet issuance units 16 are aligned so that one column of the dot matrix pattern is printed at a time by the seven ink droplets emitted from the seven ink droplet issuance units 16.

The centrifugal pressure chamber 17 is communicated to an ink liquid reservoir 25, which contains ink liquid 24 therein, via a conduit 2-1 secured within the shaft 2. The centrifugal chamber 17 functions to pull up the ink liquid 24 from the ink liquid reservoir 25 and supply the ink liquid 24 to the ink droplet issuance units 16 under a predetermined pressure while the circular plate 1 rotates around the shaft 2.

Figure 8:
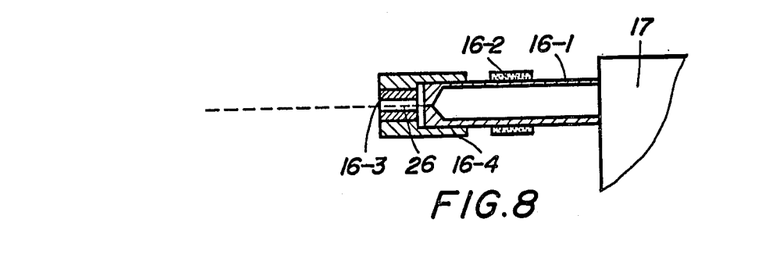
FIG. 8 is a sectional view of an ink droplet issuance unit employed in the ink jet system printer of FIG. 6.

FIG. 8 shows a construction of the ink droplet issuance unit 16.

The ink droplet issuance unit 16 comprises a nozzle pipe 16-1 which is communicated to the centrifugal pressure chamber 17 and has an orifice for emitting a stream of ink liquid, an electromechanical transducer 16-2 for vibrating the nozzle pipe 16-1 at a given frequency for providing a stream of ink droplets 26 having the given frequency, and a charging tunnel 16-3 for charging the ink droplets 26 in accordance with the print data. The charging tunnel 16-3 is supported by an insulating holder 16-4. The ultrasonic vibration signal to be applied to the electromechanical transducer 16-2, and a video signal to be applied to the charging tunnel 16-3 are derived from the data processor unit 18.

Operation of the centrifugal pressure chamber 17 will be appreciated by the following description.

The ink liquid 24 is introduced into the centrifugal pressure chamber 17 at the center of the circular plate 1. Now assume that the distance from the center of the circular plate 1 to the orifice of the nozzle pipe is r(m), the density of the ink liquid is $\rho$(kg/m$^3$), and the rotation velocity of the circular plate 1 is $\omega$(rad/s). The pressure P applied to the ink liquid at the orifice of the nozzle pipe can be calculated as follows:

$$P = \frac{\rho r^2 \omega^2}{19.6}$$

In a typical system, $r = 100 \times 10^{-3}$(m), $\rho \approx 10^3$ kg/m$^3$ and $\omega = 250$ rad/s ($\approx 2400$ rpm). In this case, $p \approx 31880$(kg/m$^2$) $\approx 3.2$(kg/cm$^2$). Accordingly, the above calculated pressure is sufficient for the system which includes the nozzle of which the diameter of the orifice is around 50 $\mu$m.

A circular shaped tray 27 is disposed below the periphery of the circular plate 1 for collecting the ink liquid caught by the beam gutter 22. That is, the ink liquid captured by the beam gutter 22 is conducted to the tray 27 through a conduit 28 formed through the circular plate 1. The thus collected ink liquid is returned to the ink liquid reservoir 25 through a conduit 29 for recirculation purposes. An ink liquid supply means 31 including an ink cartridge 33, an auxiliary ink liquid reservoir 32 and a conduit 30 is provided for maintaining the ink liqiud 24 contained in the ink liquid reservoir 25 at a desired level.

Figure 9:
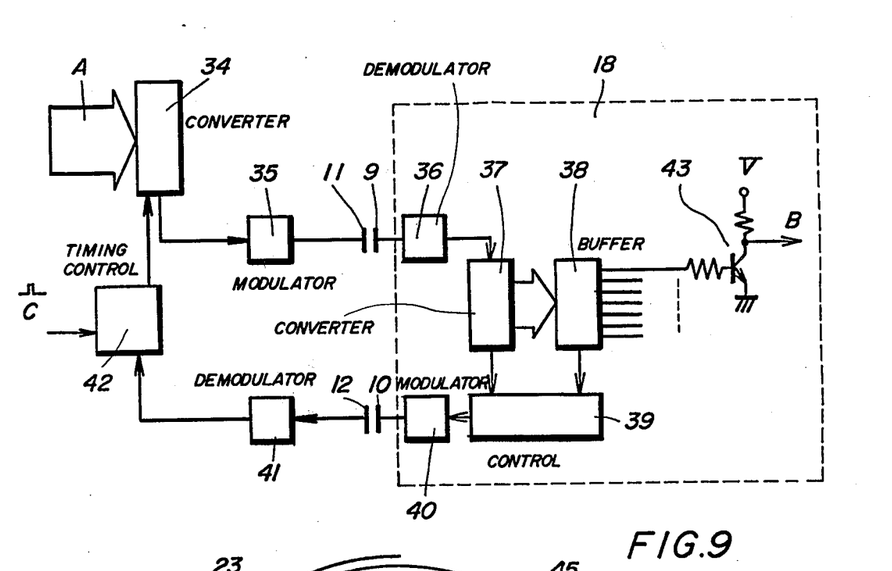
FIG. 9 is a block diagram of a control circuit of the ink jet system printer of FIG. 6.

FIG. 9 shows a control circuit of the ink jet system printer of FIGS. 6 and 7.

The circular plate 1 is driven to rotate by the motor 3. When the revolution of the circular plate 1 reaches a constant speed, a print ready signal is developed, whereby the printing is conducted when the printer head reaches a predetermined position confronting the record receiving paper 23. When the printer head reaches the above-mentioned predetermined position, the data processor unit 18 develops a control signal which is applied to the stationary electrode 12 via the electrode 10. In synchronization with the development of the control signal, the print data is introduced into the data processor unit 18 through the electrode 9 and 11 for developing the video signal.

More specifically, the print data A is introduced into a parallel-to-serial converter buffer register 34, of which output signals are applied to a modulator 35. Output signals of the modulator 35 are transferred to a demodulator 36 through the electrodes 11 and 9. Serial signals derived from the demodulator 36, which are identical with the serial signals developed from the parallel-to-serial converter buffer register 34, are applied to a serial-to-parallel converter buffer register 37 for obtaining the print data A. The thus introduced print data A are applied to a print buffer register 38.

When the print operation relating to the contents stored in the print buffer register 38 is completed, new data is introduced from the serial-to-parallel converter buffer register 37 into the print buffer register 38. In synchronization with the introduction of the print data into the print buffer register 38, a controller 39 developes a buffer ready signal for introducing the next print data into the serial-to-parallel converter buffer register 37. The thus generated buffer ready signal is applied to the electrode 10 via a modulator 40. The modulated signal is applied to a demodulator 41, of which an output signal is applied to a timing control circuit 42. The timing control circuit 42 is clocked by a clock signal C, and functions to apply the buffer ready signal to the parallel-to-serial converter buffer register 34. Accordingly, the parallel-to-serial converter buffer register 34 develops the next print data toward the serial-to-parallel converter buffer register 37.

The contents stored in the print buffer register 38 are developed by seven bits, and the respective outputs are applied to a base electrode of a transistor 43 through a resistor. The emitter of the transistor 43 is grounded, and the collector of the transistor 43 is connected to an output terminal for developing a video signal B. The collector of the transistor 43 is connected to a voltage source V of 10–300 V which is required for the video signal B.

When the output of the print buffer register 38 is the low level, the transistor 43 is OFF and, hence, the voltage V is applied to the charging tunnel as the video signal B. When the output of the print buffer register 38 is the high level, the transistor 43 is ON and, hence, the video signal B of the level V is not applied to the charging tunnel.

Figure 10:
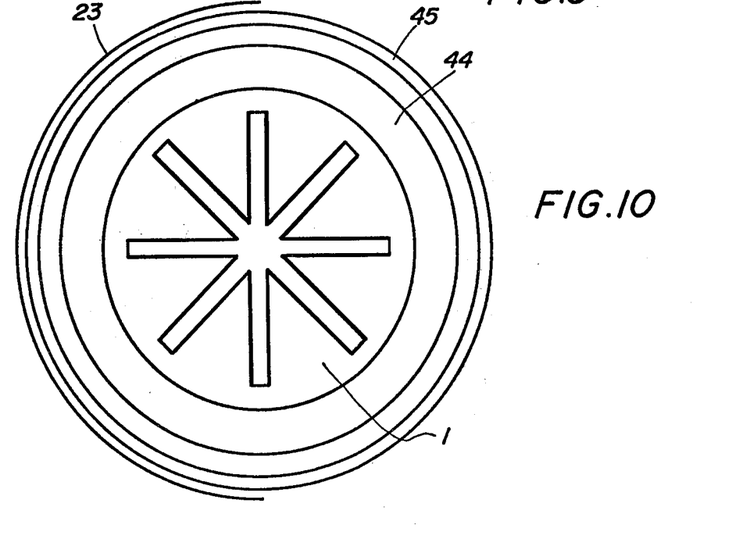
FIG. 10 is a plan view of still another embodiment of an ink jet system printer of the charge amplitude controlling type of the present invention.

FIG. 10 shows still another embodiment of an ink jet system printer of the present invention, wherein eight ink droplet issuance units are radially mounted on the circular plate 1.

The respective ink droplet issuance units develop the ink droplets for the respective dot levels in the dot matrix pattern. In this example, a pair of deflection electrodes 44 are circularly provided around the ink droplet issuance units, and the deflection electrodes 44 are parallel with the circular plate 1. A beam gutter 45 is provided at the periphery of the circular plate 1 in a circular fashion.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink jet system printer which emits charged ink droplets from an ink droplet generating means toward a record receiving medium, deflects said charged ink droplets and deposits said deflected ink droplets on said record receiving medium, wherein as desired pattern is printed on said record receiving medium, said ink droplet generating means comprising:
   a rotatable supporting table;
   means for rotating said rotatable supporting table at a selected rotational speed about a center of rotation;
   at least one ink droplet issuance means mounted on said rotatable supporting table for issuing ink droplets radially outward from said center of rotation; and
   centrifugal pressure means mounted in the center of said rotatable supporting table and connected to said ink droplet issuance means for delivering ink liquid to the latter under pressure created by centrifugal force generated in response to rotation of said rotatable supporting table, said centrifugal pressure means including,
      pressure chamber means extending substantially radially outward from said center of rotation,
      inlet means for said pressure chamber means and positioned at said center of rotation of said rotatable supporting table for introducing ink liquid into said pressure chamber means, and
      outlet means formed in said pressure chamber means and connected to said ink droplet issuance means for supplying said ink liquid to said ink droplet issuance means under a predetermined pressure which is proportional to said selected rotational speed of said rotatable supporting table.

2. An ink jet system printer means for emitting charged ink droplets toward a record receiving medium, deflecting said charged ink droplets and depositing said deflected ink droplets on said record receiving medium to print a desired pattern on said record receiving medium, said ink jet system printer means comprising:
   a record receiving medium;
   a rotatable supporting table spaced from said record receiving medium;
   means for rotating said rotatable supporting table about a center of rotation at a selected rotational speed;
   at least one ink droplet issuance means mounted on said rotatable supporting table for emitting ink droplets toward said record receiving medium; and
   centrifugal pressure means mounted on said rotatable supporting table and connected to said ink droplet issuance means for delivering ink liquid to said ink droplet issuance means under pressure created by centrifugal force generated within said centrifugal pressure means in response to the rotation of said rotatable supporting table, said centrifugal pressure means including,
      pressure chamber means extending substantially radially outward from said center of rotation for containing ink liquid,
      inlet means for said pressure chamber means, positioned at said center of rotation for introducing ink liquid into said pressure chamber means; and
      outlet means formed in said pressure chamber means and connected to said ink droplet issuance means for supplying said ink liquid to said ink droplet issuance means under a predetermined pressure which is proportional to said selected rotational speed of said rotatable supporting table.

3. In an ink jet system printer which emits charged ink droplets from an ink droplet generating means toward a record receiving medium, deflects said charged ink droplets and deposits said charged ink droplets on said record receiving medium wherein a desired pattern is printed on said record receiving medium, said ink droplet generating means comprising:
   a rotatable supporting table;
   means for rotating said rotatable supporting table at a selected rotational speed about a center of rotation;
   at least one ink droplet issuance unit means mounted on said rotatable supporting table for issuing ink droplets radially outward from said center of rotation; and
   centrifugal pressure means mounted in the center of said rotatable supporting table and connected to said ink droplet issuance unit means for delivering ink liquid to the latter under pressure created by centrifugal force generated in response to rotation of said rotatable supporting table, said centrifugal pressure means including,
      a housing defining a radially disposed elongated chamber having one end adjacent to the center of rotation of said rotatable supporting table,
      inlet means at said center of rotation and connected to said one end of said housing for introducing ink liquid into said housing, and
      outlet means formed in the opposite end of said housing and connected to said ink droplet issuance means for supplying the ink liquid to said ink droplet issuance unit means under a predetermined pressure proportional to said selected rotational speed or said rotatable supporting table.

4. An ink jet system printer means emitting charged ink droplets toward a record receiving medium, deflecting said charged ink droplets and depositing said charged ink droplets on said record receiving medium to print a desired pattern on said record receiving medium, said ink jet system printer means comprising:
- a record receiving medium;
- a rotatable supporting table spaced from said record receiving medium;
- means for rotating said rotatable supporting table about a center of rotation at a selected rotational speed;
- at least one ink droplet issuance unit means mounted on said rotatable supporting table for emitting ink droplets toward said record receiving medium; and
- a centrifugal pressure means on said rotatable supporting table and connected to said ink droplet issuance unit means for delivering ink liquid to said ink droplet issuance unit means under pressure created by centrifugal force generated within said centrifugal pressure means in response to rotation of said rotatable supporting table, said centrifugal pressure means including,
  - a housing defining a radially disposed elongated chamber extending substantially radially outward from said center of rotation for containing ink liquid,
  - inlet means for said housing, positioned at said center of rotation for introducing ink liquid into said housing, and
  - outlet means formed in said housing and connected to said ink droplet issuance unit means for supplying the ink liquid to said ink droplet issuance means under a predetermined pressure proportional to said selected rotational speed of said rotatable supporting table.

5. An ink jet system printer in accordance with claims 1, 2, 3, or 4 wherein said pressure developed at the orifice of said ink droplet issuance means is defined by the relationship:

$$P = \frac{\rho r^2 \omega^2}{19.6}$$

where $\rho$ is said pressure at the orifice of said ink liquid, r is the distance from the center of said rotatable supporting table to the orifice of said ink droplet issuance means, and $\omega$ is the rotational velocity of said centrifugal pressure chamber means.

6. An ink system printer in accordance with claims 1, 2, 3, or 4 further comprising:
conduit means connected at one end to said inlet means of said centrifugal pressure chamber means and disposed along the axis of rotation of said rotatable supporting table.

7. An ink system printer in accordance with claims 1, 2, 3, or 4 further comprising:
conduit means connected at one end to said inlet means of said centrifugal pressure chamber means and disposed along the axis of rotation of said rotatable supporting table; and
ink reservoir means for storing said ink liquid therein, said ink reservoir means communicating with the other end of said conduit means.

8. An ink system printer in accordance with claims 1, 2, 3, or 4 further comprising:
conduit means connected at one end to said inlet means of said centrifugal pressure chamber means and disposed along the axis of rotation of said rotatable supporting table;
ink reservoir means for storing said ink liquid therein, said ink reservoir means communicating with the other end of said conduit means; and
wherein a centrifugal force is created within said centrifugal pressure chamber means in response to the rotation of said centrifugal pressure chamber means by said supporting table.

9. An ink system printer in accordance with claims 1, 2, 3, or 4 further comprising:
conduit means connected at one end to said inlet means of said centrifugal pressure chamber means and disposed along the axis of rotation of said rotatable supporting table;
ink reservoir means for storing said ink liquid therein, said ink reservoir means communicating with the other end of said conduit means;
wherein a centrifugal force is created within said centrifugal pressure chamber means in response to the rotation of said centrifugal pressure chamber means by said supporting table; and
wherein a negative pressure is created within said conduit means in response to said centrifugal force created within said centrifugal pressure chamber means, said negative pressure forcing said ink liquid in said conduit means to enter said inlet means of said pressure chamber means.

10. An ink system printer in accordance with claims 1, 2, 3, or 4 further comprising:
conduit means connected at one end to said inlet means of said centrifugal pressure chamber means and disposed along the axis of rotation of said rotatable supporting table;
ink reservoir means for storing said ink liquid therein, said ink reservoir means communicating with the other end of said conduit means;
wherein a centrifugal force is created within said centrifugal pressure chamber means in response to the rotation of said centrifugal pressure chamber means by said supporting table;
wherein a negative pressure is created within said conduit means in response to said centrifugal force created within said centrifugal pressure chamber means, said negative pressure forcing said ink liquid in said conduit means to enter said inlet means of said pressure chamber means; and
wherein said ink liquid is supplied from said ink reservoir means to said conduit means in response to said negative pressure created within said conduit means.

* * * * *